US008347603B2

(12) United States Patent  (10) Patent No.: US 8,347,603 B2
Wickert et al.  (45) Date of Patent: Jan. 8, 2013

(54) METHOD FOR METERING A REAGENT FOR THE EMISSION CONTROL OF INTERNAL COMBUSTION ENGINES AND DEVICE FOR EXECUTING THE METHOD

(75) Inventors: Stefan Wickert, Albershausen (DE); Torsten Handler, Stuttgart (DE); Michael Gerlach, Waiblingen-Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 686 days.

(21) Appl. No.: 11/120,496

(22) Filed: May 2, 2005

(65) Prior Publication Data

US 2005/0251318 A1  Nov. 10, 2005

(30) Foreign Application Priority Data

Apr. 30, 2004 (DE) .......................... 10 2004 021 372

(51) Int. Cl.
 *F01N 3/00* (2006.01)
(52) U.S. Cl. ............... 60/277; 60/274; 60/286; 60/295; 60/301
(58) Field of Classification Search ............. 60/274, 60/276, 277, 286, 295, 301, 303
See application file for complete search history.

(56) References Cited

U.S. PATENT DOCUMENTS

| | | | | |
|---|---|---|---|---|
| 5,628,186 A | * | 5/1997 | Schmelz | 60/274 |
| 5,937,638 A | * | 8/1999 | Akazaki et al. | 60/274 |
| 5,987,883 A | * | 11/1999 | Schneider | 60/274 |
| 6,216,451 B1 | * | 4/2001 | Schnaibel et al. | 60/277 |
| 6,385,966 B2 | * | 5/2002 | Zhang | 60/274 |
| 6,546,720 B2 | * | 4/2003 | van Nieuwstadt | 60/286 |
| 6,629,408 B1 | * | 10/2003 | Murakami et al. | 60/277 |
| 6,644,115 B2 | * | 11/2003 | Cwik et al. | 73/290 R |
| 6,742,326 B2 | * | 6/2004 | Xu et al. | 60/284 |
| 6,766,640 B2 | * | 7/2004 | Ishizuka et al. | 60/285 |
| 6,901,745 B2 | * | 6/2005 | Schnaibel et al. | 60/285 |
| 6,993,900 B2 | * | 2/2006 | Upadhyay et al. | 60/286 |
| 7,275,363 B2 | * | 10/2007 | Miura et al. | 60/277 |
| 2003/0033799 A1 | * | 2/2003 | Scheying | 60/286 |

FOREIGN PATENT DOCUMENTS

| | | |
|---|---|---|
| DE | 196 46 646 | 5/1998 |
| DE | 197 39 848 | 3/1999 |
| DE | 101 39 142 | 2/2003 |
| DE | 103 00 760 | 8/2003 |
| EP | 1 024 254 | 8/2000 |
| WO | WO 01/38704 | 5/2001 |

* cited by examiner

*Primary Examiner* — Thomas Denion
*Assistant Examiner* — Jesse Bogue
(74) *Attorney, Agent, or Firm* — Kenyon & Kenyon LLP

(57) ABSTRACT

A method for metering a reagent which an emission control device situated in the exhaust duct of an internal combustion engine requires for removing at least one exhaust gas component from the exhaust gas and a device for executing the method are described. The fluid level of the reagent stored in a reagent tank is measured. The measured change in the fluid level is compared to at least one measure for the change in the fluid level calculated as a function of consumption. An error signal is output when the comparison result exceeds a predefined threshold value. This approach enables reliable information to be provided about the fluid level of the reagent in the reagent tank.

14 Claims, 1 Drawing Sheet

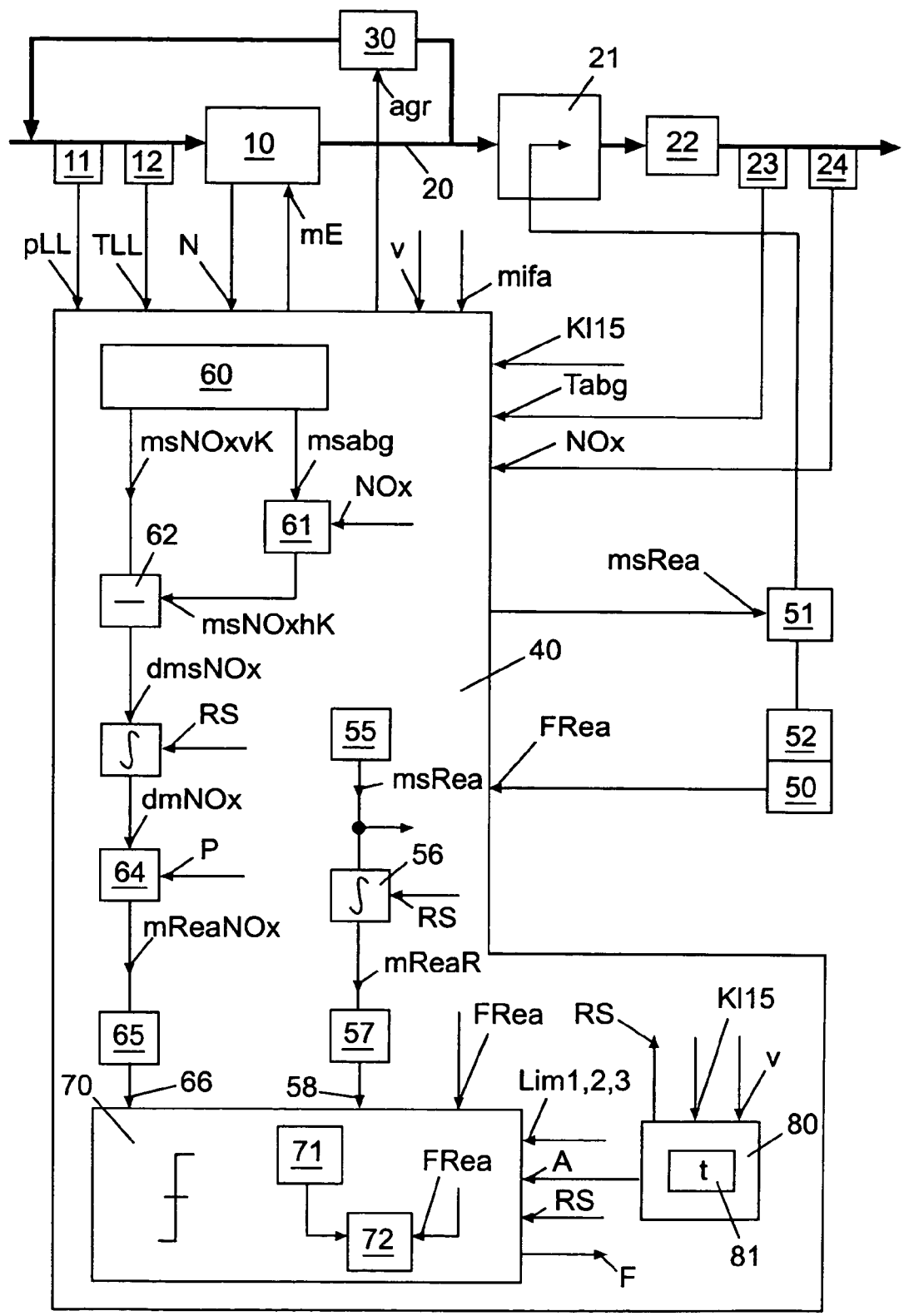

METHOD FOR METERING A REAGENT FOR THE EMISSION CONTROL OF INTERNAL COMBUSTION ENGINES AND DEVICE FOR EXECUTING THE METHOD

FIELD OF THE INVENTION

The present invention is directed to a method for metering a reagent for the emission control of internal combustion engines and a device for executing the method.

BACKGROUND INFORMATION

An exhaust gas treatment system of an internal combustion engine is described in German Published Patent Application No. 101 39 142 in which an SCR catalytic converter (selective catalytic reduction) is used for reducing the NOx emissions, the catalytic converter reducing the nitrogen oxides contained in the exhaust gas to nitrogen using ammonia as the reagent. The ammonia is extracted from a urea-water solution in a hydrolysis catalytic converter which is situated upstream from the SCR catalytic converter. The hydrolysis catalytic converter converts the urea contained in the urea-water solution into ammonia and carbon dioxide.

The urea-water solution is provided in a reagent tank. The concentration of the urea-water solution is obtained from the signals of a pressure sensor and a temperature sensor. The fluid level of the reagent tank is detected by a fluid level sensor (not shown) and may be indicated to an operator of the internal combustion engine. Removal of the at least one exhaust gas component NOx from the exhaust gas may be ensured only if an adequate quantity of the urea-water solution is available in the reagent tank.

An approach is described in German Published Patent Application No. 197 39 848 with which the NOx raw emissions may be calculated from the known performance characteristics of the internal combustion engine, at least approximately. The starting point is a characteristics field spanned by the fuel injection quantity and the speed of the internal combustion engine. Corrections may be additionally provided, e.g., as a function of air ratio lambda.

An exhaust gas treatment system of an internal combustion engine is known from European Published Patent Application No. 1 024 254 in which an SCR catalytic converter is also used for reducing the NOx emissions. Ammonia, which is extracted in the exhaust duct from a urea-water solution, is again provided as the reagent. The reagent rate is set based on the fuel injection quantity and the engine speed, as well as on at least one parameter of the exhaust gas, the exhaust gas temperature, for example.

SUMMARY OF THE INVENTION

An object of the present invention is to provide a method for metering a reagent for the emission control of internal combustion engines and a device for executing the method which provide reliable information about the fluid level of a reagent stored in a reagent tank. The object is achieved by the features listed in the independent claims.

The approach according to the present invention provides that a measured change in the fluid level in the reagent tank is compared to at least one measure for the change in the fluid level calculated as a function of consumption, and that an error signal is output when the comparison result exceeds a predefined threshold value.

The approach according to the present invention permits a validation of the fluid level provided by the fluid level sensor. If the at least one predefined threshold value is exceeded it indicates a defective fluid level sensor or a defective signal path to the fluid level sensor. The error signal, output due to the deviation, may be used, for example, for signaling the error and/or for filing in an error memory. The occurrence of the error signal may also point to an error in the fluid level calculated as a function of consumption which may have been caused by incorrect metering of the reagent, for example.

One embodiment provides that a reagent rate is determined in a reagent rate determiner, that the metered reagent mass is determined, and that a first measure for the change in the fluid level calculated as a function of consumption is provided which is compared to the measured change in the fluid level. The reagent rate determiner, which sets the required reagent rate, is present anyway. The metered reagent mass, which corresponds to the consumption of reagent which must result in a corresponding change in the measured fluid level, may be obtained from the reagent rate by integration.

One embodiment provides that the difference in mass of the exhaust gas component to be removed is determined upstream and downstream from the emission control device, that the reagent mass required for this purpose is determined, and that a second measure for the change in the fluid level calculated as a function of consumption is provided which is compared to the measured change in the fluid level. The significant advantage of this embodiment is the fact that the actual quantity of reagent implemented in the emission control device is the basis for the comparison.

One embodiment provides that at least two measures for the change in the fluid level are calculated as a function of consumption and are each compared to the measured change in the fluid level as well as to one another, and that the error signal is output when at least one comparison result exceeds the respective predefined threshold value. By including independently determined consumption-dependent measures for the change in the fluid level, this embodiment enables an advanced validation of the fluid level sensor and the signal path to the fluid level sensor as well as the input variables of the executed calculations of the changes in the fluid level.

One embodiment provides that the difference in mass of the exhaust gas component to be removed is determined from the calculated mass flow of the exhaust gas component upstream from the emission control device and the mass flow of the exhaust gas component measured downstream from the emission control device. This embodiment makes it possible for the signal, provided by at least one sensor situated downstream from the emission control device in the flow direction, to be used additionally for executing the method according to the present invention.

One embodiment provides that the comparison is carried out when the operating time of the internal combustion engine has exceeded a predefined minimum operating time. This measure ensures that the change in the fluid level has reached a value which, by including all error tolerances, produces an analyzable result of the change in the fluid level. A corresponding embodiment provides that, when a reagent tank is situated in a motor vehicle, the comparison is carried out only when the duration of the driving cycle has exceeded a predefined minimum operating time.

One embodiment provides that, when a reagent tank is situated in a motor vehicle, the comparison is not carried out when the motor vehicle's velocity is zero and the internal combustion engine is not simultaneously shut off. It cannot be ruled out in this operating state that the reagent tank is momentarily being refilled with reagent. Although no error occurred, the error signal would be output in this case.

BRIEF DESCRIPTION OF THE DRAWING

The FIGURE shows an internal combustion engine with a method according to the present invention being carried out in its surroundings.

DETAILED DESCRIPTION

The FIGURE shows an internal combustion engine 10, a pressure sensor 11, and a temperature sensor 12 being situated in its intake area. A spray device 21, an emission control device 22, an exhaust gas temperature sensor 23, as well as an NOx sensor 24 are situated in exhaust duct 20 of internal combustion engine 10. Exhaust duct 20 is connected to the intake area of internal combustion engine 10 via an exhaust gas recirculation system 30.

A controller 40 is supplied with an air pressure pLL provided by pressure sensor 11, a temperature TLL provided by temperature sensor 12, an engine speed N provided by internal combustion engine 10, an exhaust gas temperature Tabg provided by exhaust gas temperature sensor 23, an NOx concentration NOx provided by NOx sensor 24, and a fluid level (FRea) measured by a fluid level sensor 50. Moreover, a velocity v, a torque setpoint value mifa, and a start signal K1 15 are supplied to controller 40.

Controller 40 outputs a fuel injection signal mE to internal combustion engine 10, an exhaust gas recirculation rate agr to exhaust gas recirculation system 30, and a reagent rate msRea to a metering valve 51.

Fluid level sensor 50 detects the fluid level of a reagent provided in a reagent tank 52.

Controller 40 contains a reagent rate determiner 55 which determines required reagent rate msRea and supplies it to metering valve 51. In a first integrator 56, reagent rate msRea is added up to give first reagent mass mReaR calculated as a function of consumption. A reset signal RS is supplied to first integrator 56. In a first conversion 57, first reagent mass mReaR calculated as a function of consumption is converted into a first measure 58 for the change in the fluid level calculated as a function of consumption.

Controller 40 contains a calculator 60 which determines NOx mass flow msNOxvK released by internal combustion engine 10 and entire exhaust gas mass flow msabg. In a second conversion 61, exhaust gas mass flow msabg is linked to NOx concentration NOx. Second conversion 61 releases NOx mass flow msNOxhK, occurring downstream from emission control device 22, to a first subtractor 62 which determines an NOx differential mass flow dmsNOx between NOx mass flow msNOxvK of internal combustion engine 10 and NOx mass flow msNOxhK downstream from emission control device 22.

In a second integrator 63, which is supplied with reset signal RS, NOx differential mass flow dmsNOx is integrated and supplied to a third conversion 64 as NOx differential mass dmNOx. From NOx differential mass dmNOx and a conversion factor P, third conversion 64 determines a second reagent mass mReaNOx calculated as a function of consumption which is converted in a fourth conversion 65 into a second measure 66 for the change in the fluid level calculated as a function of consumption.

First as well as second measure 58, 66 for the change in the fluid level calculated as a function of consumption are supplied to a comparator 70, contained in controller 40, which contains a memory 71 and a second subtractor 72. Second subtractor 72 forms the difference between the content of memory 71 and instantaneously measured fluid level FRea.

Furthermore, a first, second, and third threshold value Lim1, Lim2, Lim3, a strobe signal A, measured fluid level FRea, and reset signal RS are supplied to comparator 70. Furthermore, controller 40 contains a sequential control 80 which has a timer 81. Sequential control 80 provides strobe signal A as well as reset signal RS. Start signal K1 15 as well as velocity v are supplied to sequential control 80.

The method according to the present invention operates as follows:

Emission control device 22, situated in exhaust duct 20, is an SCR catalytic converter, for example, which reduces nitrogen oxides NOx contained in the exhaust gas of internal combustion engine 10 to nitrogen. According to the exemplary embodiment, SCR catalytic converter 22 shall require ammonia for the reduction reaction. The ammonia may be obtained in a hydrolysis catalytic converter (not shown in detail) situated upstream from SCR catalytic converter 22 from a urea-water solution which is added to the exhaust flow using spray device 21. The urea-water solution is an example of a reagent.

Using a reagent pump (not shown in detail), the reagent stored in reagent tank 52 is pressurized to a predefined reagent pressure of 4 bar, for example, and subsequently supplied to metering valve 51. By changing the flow area, metering valve 51 is set to reagent rate msRea which is predefined by reagent rate determiner 55. From metering valve 51, the reagent reaches spray device 21 which sprays the reagent into the exhaust flow. Metering valve 51 may be placed directly on or in exhaust duct 20 and may spray the reagent directly into the exhaust flow. Support via compressed air (not shown in detail) may be provided if necessary.

Reagent rate determiner 55 determines reagent rate msRea from a predefined characteristics field, for example, which is spanned by engine speed N and fuel injection signal mE. Furthermore, exhaust gas temperature Tabg, NOx mass flow msNOxvK calculated by calculator 60, and/or the also calculated entire exhaust gas mass flow msabg, and/or other performance quantities of internal combustion engine 10 may additionally be taken into account, for example.

In first integrator 56, reagent rate msRea is added up to give first reagent mass mReaR calculated as a function of consumption. The integration starts after reset signal RS occurs, which is provided by sequential control 80. The integration is started, for example, when start signal K1 15 reaches controller 40. Start signal K1 15 indicates that internal combustion engine 10 is put into operation. First conversion 57 converts reagent mass mReaR calculated as a function of consumption and provided by first integrator 56 to first measure 58 calculated as a function of consumption for the change in the fluid level of reagent tank 52. The conversion enables a comparison with the measured fluid level FRea provided by fluid level sensor 50.

The comparison takes place in comparator 70. The measured fluid level FRea that exists currently is stored in first memory 71 at the occurrence of reset signal RS. Forming the difference in second subtractor 72 between measured fluid level FRea that exists later and earlier fluid level FRea stored in memory 71 is necessary for the subsequent comparison with first measure 58 for the change in the fluid level calculated as a function of consumption. The comparison may take place subsequent to determination of the difference. The comparison result is compared to predefined threshold value Lim1. If the comparison result exceeds predefined threshold value Lim1, error signal F is output which indicates the error that occurred and/or triggers error storage, for example.

If the fluid level has only changed insignificantly, carrying out the comparison in comparator 70 may be inexpedient. Therefore, timer 81, which relays strobe signal A to comparator 70, is expediently provided in sequential control 80. Strobe signal A causes suppression of the comparison for time t predefined by timer 81.

If internal combustion engine 10 and reagent tank 52 are situated in a motor vehicle, additional intervention in the sequence may be expedient. When start signal K1 15 is present and the driving speed is zero, it is preferably provided that the comparison is suppressed via strobe signal A. It cannot be ruled out in this operating state that reagent tank 50 is being refilled with reagent, so that the comparison in comparator 70 wrongly results in the occurrence of error signal F.

Another embodiment, which is not shown in greater detail in the figure, relates to the formation of a mean value of measured fluid level FRea which may be accomplished via low pass filtering. The mean value formation suppresses rapid changes in the fluid level in reagent tank 52 which may be caused by movements of reagent tank 52.

In an advantageous embodiment, the measure for the change in the fluid level calculated as a function of consumption may be calculated from the actually occurring reduction of the undesirable exhaust gas component in emission control device 22. In the exemplary embodiment shown, NOx is assumed to be the undesirable exhaust gas component. Calculator 60, contained in controller 40, determines NOx mass flow msNOxvK of internal combustion engine 10 preferably from a characteristics field which is spanned by engine speed N and fuel injection signal mE. A correction is advantageously carried out via the possibly existing exhaust gas recirculation agr and/or via pressure pLL measured by pressure sensor 11 situated in the intake area and/or via temperature TLL measured by temperature sensor 12 likewise situated in the intake area.

Calculator 60 may also determine entire exhaust gas mass flow msabg from known variables of internal combustion engine 10. The calculation may initially start from the exhaust gas volume flow. The exhaust gas volume flow is determined, for example, from engine speed N and an air quantity which is provided by an air sensor (not shown in detail in the figure) situated in the intake area. Furthermore, pressure pLL and/or temperature TLL and/or exhaust gas recirculation rate agr may be taken into account. By including the density, exhaust gas temperature Tabg being used for its determination, exhaust gas mass flow msabg may then be determined from the exhaust gas volume flow.

NOx mass flow msNOxhK, occurring downstream from emission control device 22, may be obtained in second conversion 61 from exhaust gas mass flow msabg including the measured NOx concentration which is provided by NOx sensor 24. The difference, determined in first subtractor 62, provides NOx differential mass flow dmsNOx which is a measure of the efficiency of emission control device 22. In second integrator 63, NOx differential mass flow dmsNOx is added up to give NOx differential mass dmNOx which is converted in subsequent third conversion 64 into second reagent mass mReaNOx calculated as a function of consumption. The conversion takes place involving conversion factor P which indicates the mass of reagent necessary for removing the undesirable exhaust gas component. In the example of the urea-water solution as the reagent, approximately 2.008 g of urea-water solution are necessary to remove one gram of NOx.

In fourth conversion 65, second reagent mass mReaNOx calculated as a function of consumption is converted into second measure 66 for the change in the fluid level calculated as a function of consumption which may be compared to the measured change in fluid level FRea and/or to first measure 58 for the change in the fluid level calculated as a function of consumption. The comparison of second measure 66 calculated as a function of consumption with the measured change in fluid level FRea may be based on first threshold value Lim1 or second threshold value Lim2. Threshold value Lim2 may include a greater tolerance which is to be taken into account in the calculations of calculator 60. The comparison between first measure 58 calculated as a function of consumption and second measure 66 calculated as a function of consumption may be based on third threshold value Lim3 which in turn takes into account the possibly occurring errors in the two different calculations of measures 58, 66.

After completion of the comparison, sequential control 80 may initiate a new cycle for determining the change in the fluid level by providing reset signal RS. The comparison cycle may be set, for example, by a timer (not shown in detail) contained in sequential control 80. A predefined operating time of internal combustion engine 10, which is determinable from the available start signal K1 15, may additionally or alternatively be used.

The device according to the present invention includes fluid level sensor 50, reagent tank 52, metering valve 51, spray device 21, emission control device 22, possibly exhaust gas temperature sensor 23, possibly NOx sensor 24, as well as controller 40 including the functions contained therein which are preferably implemented in a computer in the form of software.

What is claimed is:

1. A method for monitoring a fluid level of a reagent stored in a reagent tank for ensuring a required amount of the reagent necessary for an emission control device situated in an exhaust duct of an internal combustion engine for removing at least one exhaust gas component from an exhaust gas, comprising:
   measuring a fluid level of the reagent stored in a reagent tank to determine if a measured change is present;
   calculating as a function of consumption at least one measure for a change in the fluid level;
   comparing the measured change in the fluid level to the at least one measure in order to produce a comparison result, wherein the comparing is performed when a duration of an operation of the internal combustion engine has exceeded a predefined minimum duration; and
   providing an error signal if the comparison result exceeds a predefined threshold value.

2. The method as recited in claim 1, further comprising:
   determining a reagent rate in a reagent rate determiner;
   determining a metered reagent mass; and
   from the reagent mass, providing the at least one measure.

3. The method as recited in claim 1, further comprising:
   determining a difference in mass of the exhaust gas component upstream and downstream from the emission control device;
   determining a reagent mass;
   from the reagent mass, determining as a function of consumption at least one second measure for the change in the fluid level; and
   comparing the at least one second measure to the measured change in the fluid level.

4. The method as recited in claim 3, further comprising:
   comparing each one of the at least one measure and the at least one second measure to the measured change in the fluid level; and
   comparing each one of the at least one measure and the at least one second measure to each other; as well as to each other, wherein the error signal is provided if at least one comparison result exceeds a respective predefined threshold value.

5. The method as recited in claim 4, further comprising:
calculating a first mass flow of the exhaust gas component upstream from the emission control device;
measuring a second mass flow of the exhaust gas component downstream from the emission control device; and
determining a difference of the first mass flow and the second mass flow.

6. The method as recited in claim 1, wherein, in the case of the reagent tank situated in a motor vehicle, the comparing is performed if a duration of a driving cycle has exceeded a predefined minimum duration.

7. The method as recited in claim 1, wherein, when the reagent tank is situated in a motor vehicle, the comparing is not performed when a velocity of the motor vehicle is zero and the internal combustion engine is not simultaneously shut off.

8. The method as recited in claim 1, further comprising:
determining a mean value of the measured fluid level.

9. A device for monitoring a fluid level of a reagent stored in a reagent tank for ensuring a required amount of the reagent necessary for an emission control device situated in an exhaust duct of an internal combustion engine for removing at least one exhaust gas component from an exhaust gas, comprising:
an arrangement for measuring a fluid level of the reagent stored in a reagent tank to determine if a measured change is present;
an arrangement for calculating as a function of consumption at least one measure for a change in the fluid level;
an arrangement for comparing the measured change in the fluid level to the at least one measure in order to produce a comparison result, wherein the comparing is performed when a duration of an operation of the internal combustion engine has exceeded a predefined minimum duration; and
an arrangement for providing an error signal if the comparison result exceeds a predefined threshold value.

10. A method for monitoring a fluid level of a reagent stored in a reagent tank for ensuring a required amount of the reagent necessary for an emission control device situated in an exhaust duct of an internal combustion engine for removing at least one exhaust gas component from an exhaust gas, comprising:
measuring a fluid level of the reagent stored in a reagent tank to determine if a measured change is present;
calculating as a function of consumption at least one measure for a change in the fluid level;
comparing the measured change in the fluid level to the at least one measure in order to produce a comparison result, wherein the comparing is performed when a duration of an operation of the internal combustion engine has exceeded a predefined minimum duration;
providing an error signal if the comparison result exceeds a predefined threshold value;
determining a reagent rate in a reagent rate determiner;
determining a metered reagent mass;
from the metered reagent mass, providing the at least one measure;
determining a difference in mass of the exhaust gas component upstream and downstream from the emission control device to produce a difference result;
determining, from the difference result, a reagent mass required to convert the exhaust component;
from the reagent mass required to convert the exhaust component, determining as a function of consumption at least one second measure for the change in the fluid level;
comparing the at least one second measure to the measured change in the fluid level;
comparing each one of the at least one measure and the at least one second measure to the measured change in the fluid level; and
comparing each one of the at least one measure and the at least one second measure to each other;
wherein the error signal is provided if at least one comparison result exceeds a respective predefined threshold value.

11. The method as recited in claim 10, further comprising:
calculating a first mass flow of the exhaust gas component upstream from the emission control device;
measuring a second mass flow of the exhaust gas component downstream from the emission control device; and
determining a difference of the first mass flow and the second mass flow.

12. The method as recited in claim 10, wherein, in the case of the reagent tank situated in a motor vehicle, the comparing is performed if a duration of a driving cycle has exceeded a predefined minimum duration.

13. The method as recited in claim 10, wherein, when the reagent tank is situated in a motor vehicle, the comparing is not performed when a velocity of the motor vehicle is zero and the internal combustion engine is not simultaneously shut off.

14. The method as recited in claim 10, further comprising:
determining a mean value of the measured fluid level.

* * * * *